(12) United States Patent
Yanagimoto

(10) Patent No.: US 8,771,566 B2
(45) Date of Patent: Jul. 8, 2014

(54) METHOD OF FABRICATING INSULATING RESIN MATERIAL

(75) Inventor: Hiroshi Yanagimoto, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/981,196

(22) PCT Filed: Jan. 4, 2012

(86) PCT No.: PCT/IB2012/000010
§ 371 (c)(1),
(2), (4) Date: Jul. 23, 2013

(87) PCT Pub. No.: WO2012/104689
PCT Pub. Date: Aug. 9, 2012

(65) Prior Publication Data
US 2013/0302515 A1 Nov. 14, 2013

(30) Foreign Application Priority Data
Feb. 1, 2011 (JP) ................. 2011-019970

(51) Int. Cl.
*C08J 5/12* (2006.01)
(52) U.S. Cl.
USPC ............................ 264/123; 264/109; 264/112
(58) Field of Classification Search
None
See application file for complete search history.

(56) References Cited

U.S. PATENT DOCUMENTS

2010/0015433 A1    1/2010   Arfsten et al.

FOREIGN PATENT DOCUMENTS

| CN | 101512387 A | 8/2009 |
| JP | 11-233694 A | 8/1999 |
| JP | 2009-018215 A | 1/2009 |
| JP | 2010-144153 A | 7/2010 |
| JP | 2010-189600 A | 9/2010 |
| WO | 2008/028640 A2 | 3/2008 |
| WO | 2010/095000 A1 | 8/2010 |

OTHER PUBLICATIONS

Charles M. Hansen: "The Three Dimensional Solubility Parameter—Key to Paint Component Affinities", I. Solvents, Plasticizers, Polymers, and Resins, Journal of Paint Technology, 39, No. 505, pp. 104-117, Feb. 1967, In English.

*Primary Examiner* — Mary F Theisen
(74) *Attorney, Agent, or Firm* — Sughrue Mion, PLLC

(57) ABSTRACT

The present invention relates to a method of fabricating an insulating resin material (4) from a core/shell particle (3) having a core particle (2) containing a macromolecular compound and a shell layer (1) coating the core particle (2) and containing an inorganic compound. The method of fabrication includes mixing the core/shell particles (3) with a good solvent (10) for the macromolecular compound, infiltrating the good solvent (10) through the shell layer (1), impregnating the good solvent (10) into the macromolecular compound, molding a compact from the impregnated core/shell particles (3), and removing the good solvent from the compact by heating the molded compact.

4 Claims, 5 Drawing Sheets

F I G . 4
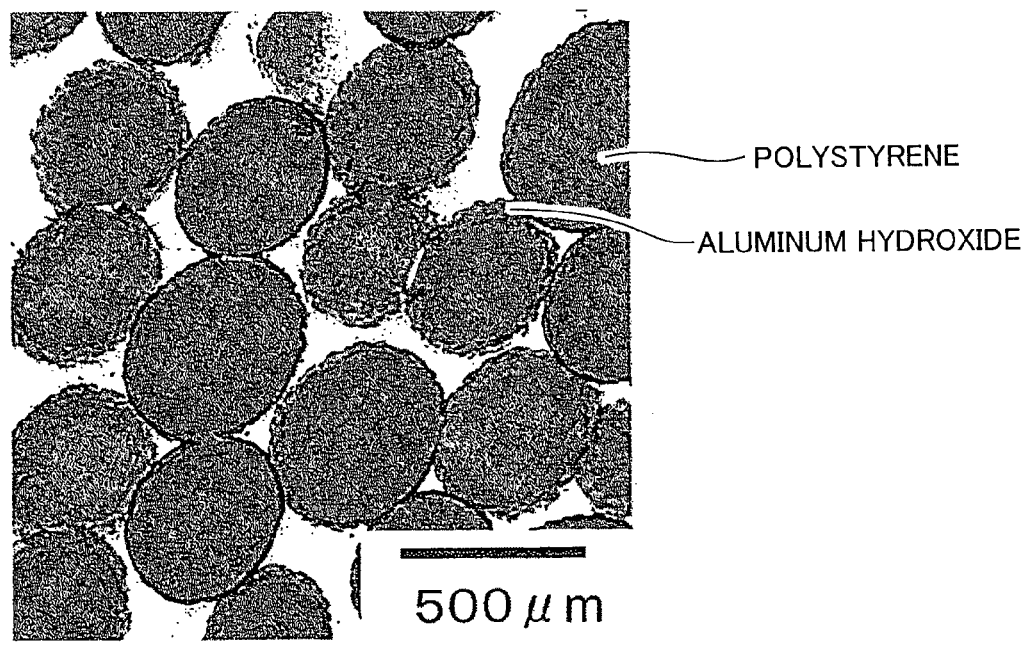

METHOD OF FABRICATING INSULATING RESIN MATERIAL

BACKGROUND OF THE INVENTION

1. Field of the Invention

The present invention relates to a method of fabricating an insulating resin material that is useful as a material for members requiring insulation and heat dissipation.

2. Description of Related Art

Since resins formed of macromolecular compounds are low-cost insulating materials with high moldability, they are used in various electric components as substrates for electronic circuit boards, insulating materials for motors, insulating adhesives, or the like. Recently, such electronic components have been configured with highly dense constructions and realized high output, resulting in increased heat generation from those electronic components. Accordingly, measures to dissipate heat of the electric components are strongly desired.

To solve such a problem, related arts employ a method that the interior of the resin is filled with a filler formed of an inorganic material such as alumina or silica, thus enhancing heat conductivity of the resin. For example, Japanese Patent Application Publication No. H11-233694 discloses a technology such that particles of an inorganic material such as crystalline silica or aluminum oxide are added into a macromolecular resin to provide heat conductivity. In such a case, a continuum formed with inorganic filler particles joined together functions as a heat conducting pathway. In other words, the inorganic filler particles filled in the resin must be in contact with each other. Accordingly, it is required that a large amount of inorganic filler be filled in the resin to achieve efficient heat conduction.

In consideration of such a problem, for example, Japanese Patent Application Publication 2010-189600 discloses a method of fabricating an insulating resin material, by which core/shell particles including core particles having a macromolecular compound and shell layers coating the core particles and having a heat-conductive and insulating inorganic compound are fabricated by seed diffusion polymerization in an ionic liquid, and by which the insulating resin material is molded from an aggregate of the core/shell particles.

Further as another embodiment, Japanese Patent Application Publication 2010-144153 discloses a method of fabricating a insulating resin material by which an aggregate of core/shell particles in which a core formed of a macromolecular compound is coated with a shell layer formed of an inorganic compound, is compression-molded into a compact, the molded compact is impregnated with a sol, the sol is next gelatinized, and the gel is then hardened to obtain the insulating resin material.

According to these embodiments, use of the core/shell particles enables reduction in the ratio of inorganic compound which serves as the shell layer to the macromolecular compound which serves as the core and enables obtainment of an insulating resin material with high heat dissipation.

As described above, in molding an insulating resin material from an aggregate of core/shell particles, compression-molding is preferable. However, control of temperature, pressure, and time is required to continuously form shell layers of an insulating resin material without interposing gaps among the particles in the aggregate. An investigation for finding out the optimum conditions requires a large amount of time. Even if the optimum conditions were found, limited shapes of the insulating resin material might be available.

In other words, differently from insulating resin materials formed of only a macromolecular compound, the shell layers of insulating resin materials formed of core/shell particles are inorganic layers. Accordingly, since the shells are not softened by pressure, the insulating resin materials tend to have narrow adequate conditions for molding compared to the compacts formed of only a macromolecular compound.

Further, differently from the insulating resin materials formed of only a macromolecular compound, molding of the insulating resin materials from an aggregate of core/shell particles requires a large amount of energy for heating and pressurization, resulting in a higher fabrication cost.

SUMMARY OF THE INVENTION

The present invention provides a method of fabricating an insulating resin material which enables low-cost fabrication of the insulating resin material without narrowing molding conditions even if a compact is molded from core/shell particles in which a core particle formed of a macromolecule compound is coated with a shell layer formed of an inorganic compound.

The inventors have made extensive studies and found new knowledge that prior to molding an aggregate of core/shell particles in which a core formed of a macromolecular compound is coated with a shell layer formed of an inorganic compound, the macromolecular compound (resin) to become the core is swollen with a good solvent for the macromolecular compound and a resistance in molding the core/shell particles can be thereby reduced.

The present invention is based on such new knowledge. Embodiments of the present invention relates to a method of fabricating an insulating resin material. In this method, an insulating resin material is fabricated from a core/shell particle having a core particle containing a macromolecular compound and a shell layer coating the core particle and containing an inorganic compound. Further, this method includes mixing the core/shell particles with a good solvent for the macromolecular compound, infiltrating the good solvent into the core/shell particle through the shell layer, impregnating the good solvent into the macromolecular compound, molding a compact from the impregnated core/shell particles, and removing the good solvent from the compact by heating the molded compact.

Here, examples of "insulating resin material" in the method of fabrication in accordance with embodiments of the present invention include block-shaped molded resin products with insulation properties, resin films (resin films coated onto substrate surfaces by use of inkjet printers), resin sheets or resin films with insulation properties, and the like, and include resin materials molded or formed from materials formed of insulating resins.

In the method of fabrication in accordance with embodiments of the present invention, the core/shell particles are mixed with the good solvent for the macromolecular compound (macromolecular resin), and the good solvent infiltrates through micro gaps of the shell layer and reaches the macromolecule compound.

Here, when the good solvent contacts with the macromolecular compound, the polymer chain of the macromolecule compound is cut and the resulting portions dissolve in the solvent (swells the macromolecular compound). However, in the present invention, the shell layer containing the inorganic compound is present around the core, thus holding the swollen macromolecular compound inside the shell layer.

As described above, the core/shell particle having the macromolecular compound impregnated with the good solvent allows the core particle to sustain a virtually swollen form. As a result, as if liquid were coated with a membrane, the core becomes soft, thereby enhancing flexibility of the whole core/shell particle. This facilitates molding of a compact from the impregnated core/shell particle without softening the core by heating.

Here, "good solvent" in the method of fabrication in accordance with embodiments of the present invention is a solvent with strong solubility for the macromolecular resin forming the core. On the other hand, "poor solvent" has weak solubility for the macromolecular resin forming the core.

The compact is subsequently dried, and the good solvent impregnated into the macromolecular compound is vaporized, and removed from the compact. The insulating resin material can be thereby obtained. The insulating resin material obtained in such a manner can form a continuous shell layer without gaps among particles in the compact.

Here, molding to a compact in the method of fabrication in accordance with embodiments of the present invention can be either one of molding with pressurizing and/or heating and molding without pressurizing or heating. Examples of the molding include formation (coating) of a film by application, casting, extrusion molding, injection molding, press molding, and the like. The method of molding to the compact is not limited as long as a desired compact can be molded from the impregnated core/shell particles.

In the method of fabrication in accordance with embodiments of the present invention, when the compact is formed, a surface of a substrate is coated with the impregnated core/shell particles, and an insulating film as the compact may be thereby formed on the substrate surface.

According to the method of fabrication, the insulating film (compact) coated onto the substrate are further dried, the solvent is removed from the insulating film, and an insulating film material with the substrate surface coated with the insulating film can be thereby obtained.

In the method of fabrication in accordance with embodiments of the present invention, the substrate is a plate-shaped substrate, and the impregnated core/shell particles are applied onto the substrate surface when the compact is formed. After the insulating film as the compact is formed, the good solvent is removed from the compact. The insulating film which is the compact may be peeled off from the substrate surface. The method of fabrication facilitates fabrication of film or sheet formed of an insulating resin material.

In the method of fabrication in accordance with embodiments of the present invention, the thickness of the shell layer may be at least 0.01 µm, and may be more preferably at least 0.02 µm. If the thickness of the shell layer is thinner than 0.01 µm, the core/shell particle cannot keep the form of particle after it is impregnated with the good solvent which will be later described, resulting in a discontinuous shell layer in the insulating resin material after molding. Further, the shell layer with a thickness of at least 0.02 µm ensures the continuous shell layer of the insulating resin material.

In the method of fabrication in accordance with embodiments of the present invention, the thickness of the shell may be 5 µm or thinner and may be more preferably 1 µm or thinner.

BRIEF DESCRIPTION OF THE DRAWINGS

Features, advantages, and technical and industrial significance of exemplary embodiments of the invention will be described below with reference to the accompanying drawings, in which like numerals denote like elements, and wherein: FIGS. 1A to 1C are schematic diagrams for illustrating a method of fabricating an insulating resin material from core/shell particles in accordance with embodiments of the present invention, in which FIG. 1A is schematic conceptual diagram of the core/shell particles, FIG. 1B is a schematic conceptual diagram for illustrating a step of impregnating the core/shell particles shown in FIG. 1A with a good solvent, and FIG. 1C is a schematic conceptual diagram for illustrating a step of molding an insulating resin material from the core/shell particles shown in FIG. 1B and a step of removing the good solvent from a compact;

FIGS. 3A to 3C are schematic conceptual diagrams for illustrating a molding step for obtaining a compact, in accordance with embodiments of the present invention, in which FIG. 3A illustrates injection molding, FIG. 3B illustrates formation of a film of a coating material, and FIG. 3C illustrates molding into a film;

FIG. 4 is a photograph of the core/shell particles in accordance with example 1.

DETAILED DESCRIPTION OF EMBODIMENTS

A method of fabricating an insulating resin material in accordance with the present invention will be described hereinafter with embodiments.

Figure 1A:
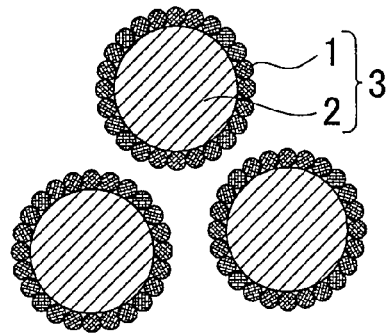
Figure 1B:
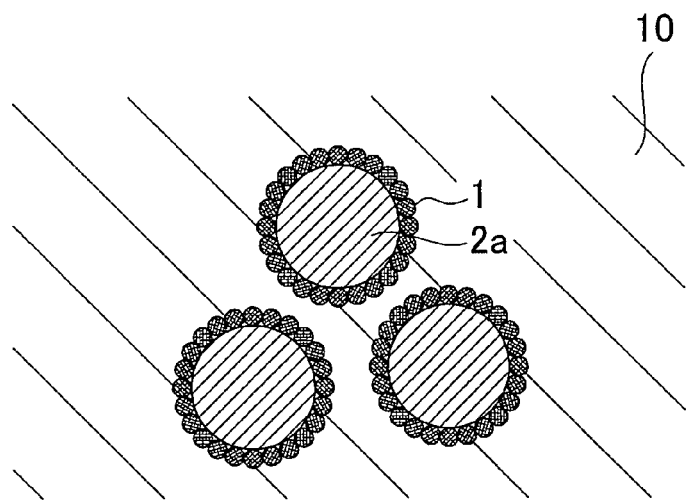
Figure 1C:
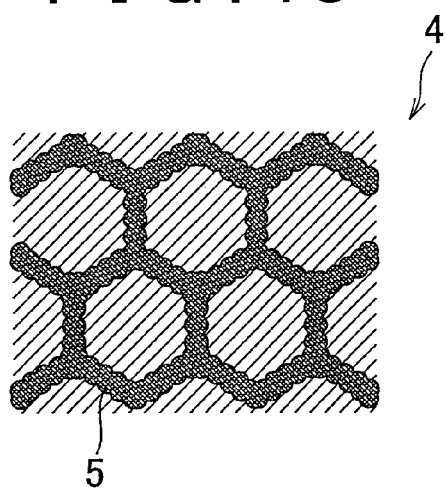

FIGS. 1A to 1C are schematic diagrams for illustrating a method of fabricating an insulating resin material from core/shell particles in accordance with embodiments of the present invention, in which FIG. 1A is schematic conceptual diagram of the core/shell particles, FIG. 1B is a schematic conceptual diagram for illustrating a step of impregnating the core/shell particles shown in FIG. 1A with a good solvent, and FIG. 1C is a schematic conceptual diagram for illustrating a step of molding an insulating resin material from the core/shell particles shown in FIG. 1B and a step of removing the good solvent from a compact.

Figure 2:
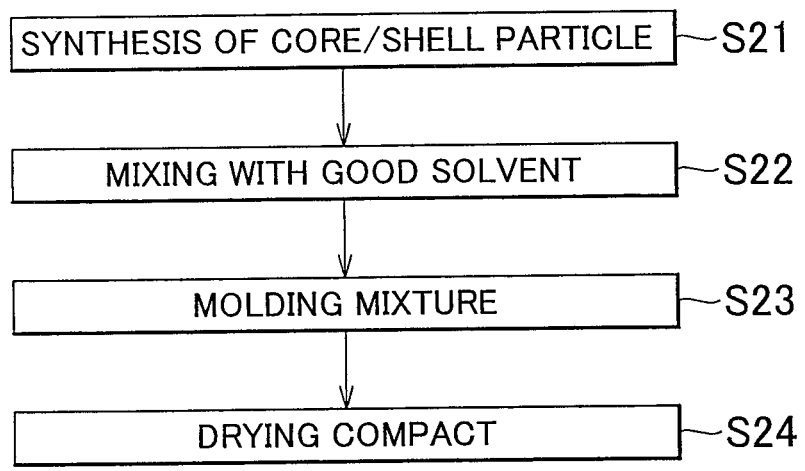
FIG. 2 is a flowchart for illustrating the method of fabricating the insulating resin material from the core/shell particles, in accordance with embodiments of the present invention.
Figure 3A:
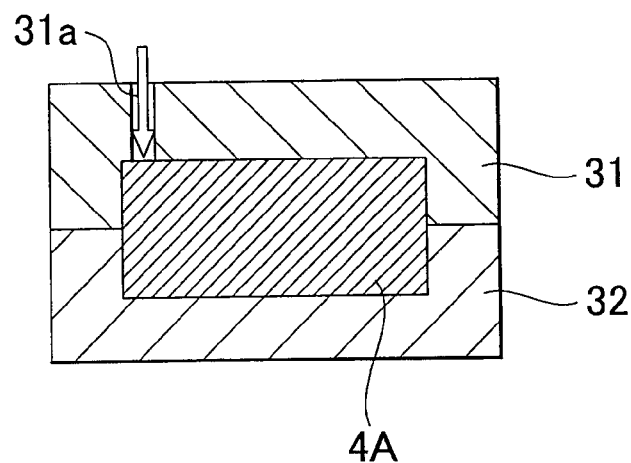
Figure 3B:
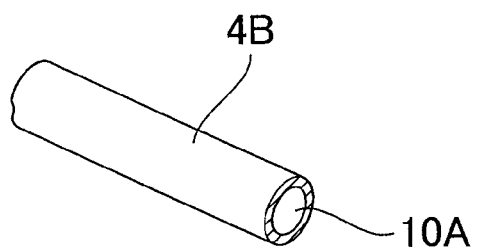
Figure 3C:
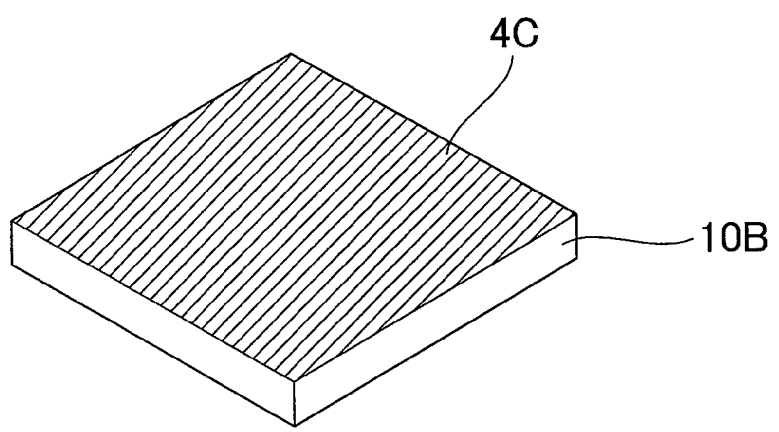

FIG. 2 is a flowchart for illustrating the method of fabricating the insulating resin material from the core/shell particles in accordance with embodiments of the present invention. FIGS. 3A to 3C are schematic conceptual diagrams for illustrating a molding step for obtaining a compact, in accordance with embodiments of the present invention, in which FIG. 3A illustrates injection molding, FIG. 3B illustrates formation of a film of a coating material, and FIG. 3C illustrates molding into a film.

1. Step of Synthesizing Core/Shell Particles

Referring to FIG. 1A, Step S21 of synthesizing the core/shell particles of FIG. 2 will be described.

The core particle fabricated in this embodiment preferably has a diameter of 50 to 2,000 nm. Macromolecules for forming the core particles are not particularly limited as long as they are macromolecular compounds with electrically insulating property. Examples of those include monomers without polar functional groups such as styrene, epoxy, nylon, α-methylstyrene, vinyl toluene, vinyl biphenyl, vinyl naphthalene, vinyl acetate, vinyl propionate, and the like, and monomers with polar functional groups such as acrylic acid; methacrylic acid, 2-hydroxyethyl methacrylate, 2-dimethylaminoethyl methacrylate, n-butyl acrylate, methyl methacrylate, ethyl methacrylate, methacrylate, acrylonitrile, benzyl methacrylate, and the like. A simple polymer or copolymer formed from at least one kind of monomer selected from those monomers can be used for forming the macromolecular compound. The core particles formed of the macromolecular compound with polar functional groups are employed, thereby enabling formation of thick and uniform inorganic shell layer.

For an application where an aggregate of the core/shell particles is molded with heat (for example, by a casting process) to obtain a heat-conductive insulating resin material, monomer components are preferably combined together such that the glass transition temperature (softening temperature) of the macromolecular compound which forms the core particles is not more than 40° C.

The core particles may be obtained by purchasing commercial products or may be prepared at a phase prior to the shell forming reaction. The monomer components and a polymerization reaction initiator are added into a solvent, the polymerization reaction is allowed to progress, and the core particles containing the macromolecular compound may be thereby produced.

The surface of a core particle 2 obtained in the above-described manner is coated by a shell layer 1 which contains a heat-conductive and insulating inorganic compound (preferably formed of the inorganic compound). Accordingly, a core/shell particle 3 is obtained.

Examples of "heat-conductive and insulating inorganic compounds" include inorganic compounds containing metals such as aluminum, magnesium, germanium, indium, and titanium, boron, and silicon, preferably oxides, fluorides, nitrides, and carbides of those elements, further preferably silica (silicon dioxide), alumina (aluminum oxide), aluminum fluoride, magnesium oxide, and titanium dioxide. These inorganic compounds in the shell layer may be in their crystalline states or amorphous states, but may be more preferably in their crystalline states.

The content of the heat-conductive and insulating inorganic compounds may be preferably 2 to 30 wt % with respect to the whole weight of the core particle and may be more preferably 3 to 20 wt %. More specifically, the thickness of the shell layer may be 0.005 to 5 μm and may be more preferably 0.01 to 1 μm. The thickness of the shell layer may be further preferably at least 0.02 μm.

If the thickness of the shell layer is thinner than the above-described range, the core/shell particle cannot keep the form of particle after it is impregnated with a solvent which will be later described, resulting in a discontinuous shell layer in the insulating resin material after molding. The shell layer with a thickness of at least 0.02 μm ensures the continuous shell layer of the insulating resin material after molding. On the other hand, the core/shell particles with the shell layer thicker than the above-described range may have decreased flexibility, thus resulting in difficulty in molding into an insulating resin material.

The shell layer of the inorganic compound is preferably formed by a seed dispersion polymerization with the core particles being seeds. In a seed dispersion polymerization, the precursor of the inorganic compound and reaction initiator of the reaction for forming the inorganic compound from the precursor is added into a dispersion liquid having the core particles in a solvent, and the inorganic compound is allowed to deposit on the surfaces of the core particles to form the shell layer.

In another embodiment, the sol-gel process can be particularly preferably employed to coat the core particles with the inorganic compound. In the sol-gel process, an inorganic compound is formed from a precursor by use of the dehydrative condensation reaction. As the precursor, silicon or metal alkoxide (for example, an alkoxide derived from a monohydric alcohol having five or less carbons) can be used. Examples of reaction initiators of reactions that produce the inorganic compounds from the precursors such as alkoxide compounds in the sol-gel process are acidic initiators such as hydrochloric acid, acetic acid, and formic acid, and basic initiators such as dimethylamine, sodium hydroxide, potassium hydroxide, and aqueous ammonia. All of those initiators can be preferably used. Examples of the solvents used for the dispersion liquid containing the core particles include alcohols, ionic liquids, water, hexane, petroleum ethers, acetone, ethyl acetate, and the like. Deposition of the inorganic compound from the precursor by the sol-gel process normally provide the inorganic compound in its amorphous state. Accordingly, the inorganic compounds may have low heat conductivity immediately after deposition.

Conditions such as amount of the precursors of the inorganic compound which is added into the core particle dispersion liquid, amount of the initiator, reaction temperature of the shell forming reaction, reaction time are not particularly limited. However, some preferable conditions are the following. The precursor of the inorganic compound is preferably 2% to 50% to the core particles in the weight ratio. Although an acidic or basic initiator as a catalyst is not necessarily required, if used, 1 to 80 mol of the initiator is preferably used to 1 mol of the precursor of the inorganic compound. The reaction temperature of the shell forming reaction is preferably from the room temperature to 90° C. The reaction time is preferably 3 to 48 hours. The liquid may be stirred to prevent the particles from precipitating or floating.

Here, in a case that, for example, polystyrene particles (PS) are used as the core particles, tetraethoxysilane as the precursor of silica and sodium hydroxide as the reaction initiator are added into the dispersion liquid having the polystyrene particles in water. The resulting liquid is allowed to react at 70° C. for 24 hours. The sol-gel reaction progresses at a slow rate, forming the shell layer of silica on the surface of the core particle.

The core/shell particle 3 includes the core particle 2 having a macromolecular compound (preferably formed of the macromolecular compound) and the shell layer 1 coating the core particle 2 and containing a heat-conductive and insulating inorganic compound (preferably formed of the inorganic compound).

2. Step of Mixing with Good Solvent

Referring to FIG. 1B, step S22 of mixing the core/shell particles with a good solvent illustrated in FIG. 2 will be next described. Specifically, as shown in FIG. 1B, the core/shell particles 3 are mixed with a good solvent 10 for a macromolecular compound forming the core particles (cores) 2.

When polystyrene is selected as the macromolecular compound forming the core particle (core) 2, examples of good solvents for polystyrene include benzene, toluene, xylene, diethylbenzene, ethylbenzene, tetrahydrofuran, dimethylformamide, dioxane, chloroform, dimethyl sulfoxide, pyridine, and the like. For reference, examples of poor solvents include water, methanol, ethanol, butanol, hexane, heptane, octane, decane, and the like.

As described above, the core/shell particles 3 are mixed with the good solvent 10 for the macromolecular compound forming the core (particle) 2, and the good solvent is infiltrated through the shell layer 1 into the core/shell particles 3, thereby impregnating the macromolecular compound with the good solvent.

In other words, the core/shell particles 3 are mixed with the good solvent 10 for the macromolecular compound (macromolecular resin). The good solvent 10 then infiltrates through micro gaps of the shell layer 1 and reaches the macromolecular compound.

Here, when the good solvent 10 contacts with the macromolecular compound, the polymer chain of the macromolecular compound is cut, the resulting portions dissolve in the solvent, and the macromolecular compound swells. However, the shell layer 1 containing the inorganic compound is present around the core 2, thus holding the swollen macromolecular compound inside the shell layer 1. As described above, the core/shell particle having the macromolecular compound impregnated with the good solvent 10 allows the core (layer) to sustain a virtually swollen form. As a result, as if liquid were coated with a membrane, the core 2 becomes soft, thereby enhancing flexibility of the whole core/shell particle. As described later, this facilitates molding of a compact from the impregnated core/shell particle without softening the core by heating.

3. Step of Molding Mixture

Referring to FIGS. 3A to 3C, step S23 of molding a mixture illustrated in FIG. 2 will be next described. Specifically, as shown in any of FIGS. 3A to 3C, a compact is molded from the core/shell particles impregnated with the good solvent.

As shown in FIG. 3A, the core/shell particles (aggregate thereof) impregnated with the good solvent may be injected into a molding die formed with an upper die 31 and a lower die 32 through an introduction opening 31a formed in the upper die 31, thereby molding a compact 4A inside the molding die. In such an embodiment, a preferable macromolecular compound is polyurethane and a corresponding good solvent is methyl ethyl ketone.

Further, as shown in FIG. 3B, a surface of an electrically conductive substrate 10A may be coated with the core/shell particles (aggregate thereof) impregnated with the good solvent by dipping, thereby obtaining the substrate 10A having an insulating film 4B formed on its surface as a compact. In such an embodiment, a preferable macromolecular compound is polyphenylene sulfide and a corresponding good solvent is an aqueous nitric acid solution.

In this embodiment, the insulating film 4B as the compact is coated on the surface of the substrate 10A by dipping. However, for example, an insulating film as a compact may be partially formed (coated) on a surface of an electrically conductive substrate by use of an inkjet dispenser or by screen printing.

Further, as shown in FIG. 3C, the core/shell particles (aggregate thereof) impregnated with the good solvent is applied onto a surface of a plate-shaped substrate 10B, and the insulating film 4C as the compact is thereby formed. After a step of removing the good solvent from the compact, which will be described later, the insulating film 4C as the compact is peeled off from the surface of the substrate 10B, and a film-shaped or sheet-shaped insulating resin material may be thereby formed. In such an embodiment, a preferable macromolecular compound is polyimide and a corresponding good solvent is N,N'-dimethyl acetamide.

4. Step of Drying Compact.

Referring to FIG. 1C, step S24 of drying the compact illustrated in FIG. 2 will be next described. Specifically, the compact 4A shown in FIG. 3A and the insulating films 4B and 4C as the compacts shown in FIGS. 3A and 3C are dried, thereby removing the good solvents impregnated into the macromolecular compounds from the compacts (insulating films). When the insulating films 4B and 4C are dried, they may be heated according to necessity. This step of drying the compacts may be conducted together with the step of molding the mixture. As described above, the dried insulating film 4C is peeled off from the substrate and serves as the sheet-shaped or film-shaped insulating resin material.

In such a manner, a compact, insulating film, or film (or sheet) formed of a heat-conductive insulating resin material 4 can be fabricated from the compact 4A (or the insulating film 4B or 4C) which is aggregate of the core/shell particles 3. The shell layer 1 of the inorganic compound is continuously joined together in the heat-conductive insulating resin material 4 to form a continuous heat conducting pathway 5. The heat conducting pathway 5 is three-dimensionally networked and functions to conduct heat. As described above, efficient formation of a heat conducting pathway from a small amount of inorganic compound is enabled.

The present invention will be described hereinafter with examples.

Example 1

Step of Synthesizing Core/Shell Particles

A sol-gel reaction with an aluminum alkoxide being a precursor was applied to synthesize a structure (core/shell particle) in which a core surface of polystyrene (PS) was coated with a shell layer of an aluminum compound.

Core particles (polystyrene particles) were first synthesized. Dissolving 2.5 g of a styrene monomer and 125 mg of a dispersion stabilizer PVP (polyvinyl pyrrolidone) in 21.3 g of an ionic liquid ([Bmim] [BF4]), 10 mass % of solid components were allowed in the ionic liquid, and 25 mg of a reaction initiator V-40 (1,1'-azobis(cyclohexane-1-carbonyl)) was added to the liquid to synthesize polystyrene particles (PS particles). The polymerization reaction was conducted in a glass container at 70° C. at 400 rpm of stirring speed for 24 hours. The diameter of the obtained PS particle was 0.5 μm.

Into the obtained PS particle dispersion liquid, 0.13 g of aluminum isopropoxide (AliPO) was added and dissolved in the liquid by heating at 130° C. for 3 hours. After the liquid was cooled to the room temperature, 0.2 g of ammonium hydroxide ($NH_4OH$) which is the sol-gel reaction initiator was dropped every 30 minutes until the total amount of 1 g was reached, and the resulting liquid was allowed to react in a glass container at 70° C. at 400 rpm of stirring speed for 24 hours. The resulting product underwent centrifugal washing with methanol and water and negative-pressure drying, thereby obtaining the core/shell particles in which the core particles formed of polystyrene were coated with the shell layers of an aluminum compound (aluminum hydroxide). FIG. 4 shows the results of microscopy of the core/shell particles. The coating shell layer had a thickness of 20 nm.

Step of Mixing with Good Solvent

Mixing 10 g of the obtained core/shell particles and 100 g of toluene solvent which is a good solvent for polystyrene together while being stirred, the good solvent was infiltrated into the interior of the core/shell particle through the shell layer, and polystyrene was impregnated with the good solvent.

Step of Molding Mixture

The core/shell, particles impregnated with the good solvent was coated onto a glass substrate by a spin coater to form a compact (insulating film) with a thickness of 0.010 mm.

Step of Drying Compact

The insulating film formed on the glass substrate was dried at 50° C. for 10 minutes, thereby removing toluene which is the good solvent from polystyrene contained in the insulating film (compact). Subsequently, the insulating film was peeled off from the glass substrate, thereby fabricating an insulating resin film (insulating resin material).

Example 2

In a similar manner to example 1, an insulating resin film (insulating resin material) was fabricated. The points different from example 1 are that the amount of aluminum isopropoxide (AliPO) and the dropping amount and time of ammonium hydroxide (NH$_4$OH) were changed and that the thickness of the coating shell layer was set to 9 nm.

Comparative Example 1 or 2

Fabrication of an insulating resin film (insulating resin material) was attempted in a similar manner to example 1. The point different from example 1 is that methanol which is a poor solvent for polystyrene was used instead of toluene which is a good solvent for polystyrene. However, in comparative example 1, the insulating resin film was not formed. Accordingly, the core/shell particles were coated onto a glass substrate by a spin coater, and the dried product was subsequently observed by microscopy. FIG. 5B shows the results.

Comparative Example 2

Fabrication of an insulating resin film (insulating resin material) was attempted in a similar manner to example 2. The point different from example 1 is that methanol which is a poor solvent for polystyrene was used instead of toluene which is a good solvent for polystyrene. However, in comparative example 2 similarly to comparative example 1, the insulating resin film was not formed either.

Measurement of Heat Conductivity

Heat conductivity of the insulating resin films of examples 1 and 2 and comparative examples 1 and 2 were measured. After both sides of the insulating resin films were coated with carbon spray for a blacking process, thermal diffusivity was measured by the laser flash method. The densities of the insulating resin films and specific heat capacities were measured by the Archimedean method and the DSC method, respectively.

Heat conductivity $\lambda(W \cdot m^{-1} \cdot K^{-1})$ was calculated from thermal diffusivity $\alpha$ ($m^2 \cdot s^{-1}$), density $\rho$ ($kg \cdot m^{-3}$), and specific heat capacity $C_p$ ($J \cdot kg^{-1} \cdot K^{-1}$) that were measured as described above by the following equation: $\lambda = \alpha \rho C_p$.

[Result and Discussion]

Figure 5A:
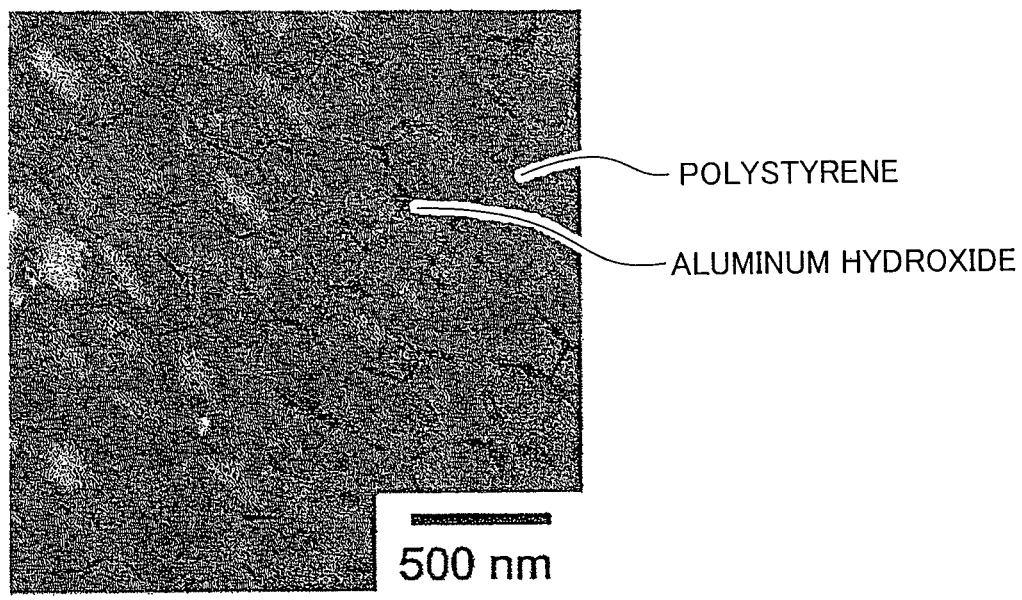
FIG. 5A is a photograph of the insulating resin material in accordance with example.
Figure 5B:
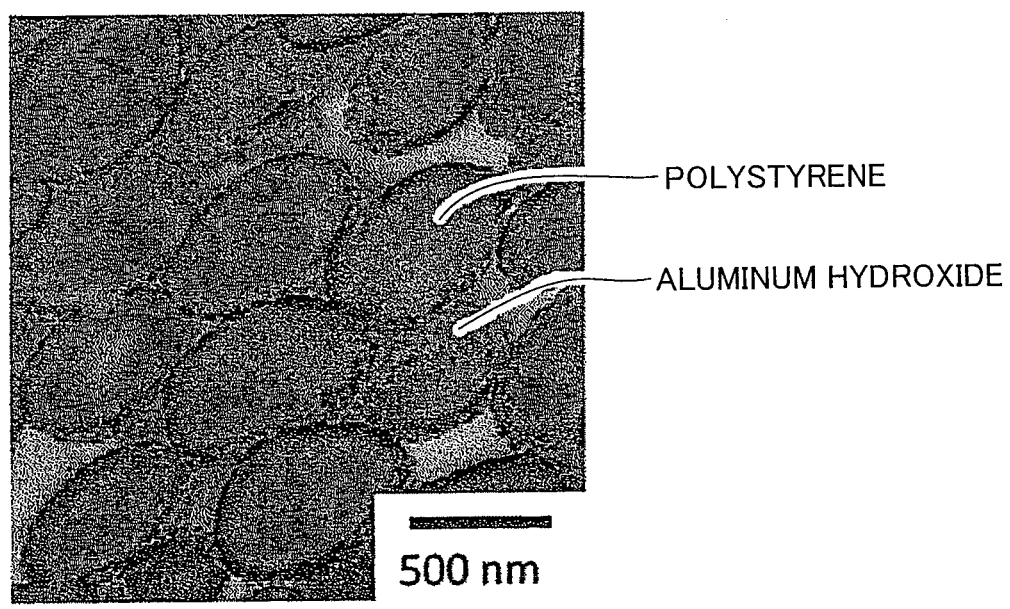
FIG. 5B is a photograph of an insulating resin material in accordance with a comparative example.

As shown in FIG. 5A, in examples 1 and 2, the insulating resin films are, without applied pressure, molded (formed) in a state where the core/shell particles were densely packed without gaps. On the other hand, as shown in FIG. 5B, in comparative examples 1 and 2, dispersed core/shell particles indicate that no insulating resin film was molded (formed).

In this viewpoint, it is considered that the core/shell particle in which polystyrene is impregnated with toluene serving as a good solvent has its core capable of sustaining a virtually swollen form. Accordingly, as if liquid were coated with a thin membrane, flexibility of the whole core/shell particle is enhanced, and the insulating resin film can be easily molded (formed) with no pressure application.

In examples 1 and 2, the insulating resin films were formed. The insulating resin film of example 1 had heat conductivity of 0.95 ($W \cdot m^{-1} \cdot K^{-1}$). The insulating resin film of example 2 had heat conductivity of 0.6 ($W \cdot m^{-1} \cdot K^{-1}$). These insulating resin films showed high heat conductivity compared to conventional films.

Further, the result of microscopy shows that example 1 had more continuous heat conducting pathway in the insulating resin film than example 2. Accordingly, it is considered that the insulating resin film of example 1 had higher heat conductivity than the film of example 2.

The invention claimed is:

1. A method of fabricating an insulating resin material from core/shell particles each having a core particle containing polystyrene and a shell layer coating the core particle and containing an inorganic compound, the method comprising:
    a step of mixing the core/shell particles with benzene, toluene, or xylene, infiltrating the mixed benzene, toluene, or xylene into an inside of each of the core/shell particles through the shell layer, and impregnating the polystyrene with the mixed benzene, toluene, or xylene;
    a step of molding a compact from the core/shell particles after the impregnation; and
    a step of removing the impregnated benzene, toluene, or xylene from the compact by drying the molded compact.

2. The method of fabricating an insulating resin material, the method according to claim 1, wherein the step of molding the compact is a step of forming an insulating film as the compact surface of a substrate by coating the surface of the substrate with the core/shell particles after the impregnation.

3. The method of fabricating an insulating resin material, the method according to claim 2,
    wherein the substrate is a plate-shaped substrate;
    in the step of molding the compact, the insulating film which is the compact is formed by applying the core/shell particles after the impregnation on to the surface of the substrate; and
    after the step of removing the impregnated benzene, toluene, or xylene from the compact, the insulating film which is the compact is peeled off from the surface of the substrate.

4. The method of fabricating an insulating resin material, the method according to claim 1, wherein a thickness of the shell layer of each of the core/shell particles is at least 0.01 μm.

* * * * *